Patented Mar. 9, 1926.

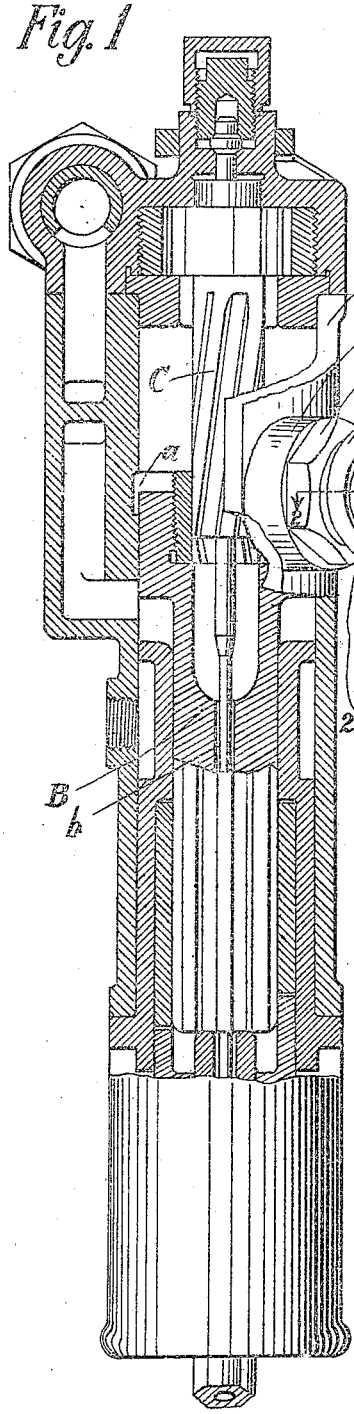

1,576,063

UNITED STATES PATENT OFFICE.

ERNEST PENBERTHY, OF DETROIT, MICHIGAN, ASSIGNOR TO CHICAGO PNEUMATIC TOOL COMPANY, OF NEW YORK, N. Y., A CORPORATION OF NEW JERSEY.

FLUID-REGULATING VALVE.

Application filed January 28, 1924. Serial No. 689,083.

*To all whom it may concern:*

Be it known that I, ERNEST PENBERTHY, a citizen of the United States of America, and resident of Detroit, in the county of Wayne and State of Michigan, have invented new and useful Improvements in Fluid-Regulating Valves, of which the following is a specification.

This invention relates to fluid regulating valves particularly adapted and intended for use on fluid pressure percussive tools, such as pneumatic rock drills, to cut-off or choke the exhaust so as to direct the pressure fluid through the hollow drill steel to clear away the cuttings, but it is to be understood that the invention is not limited to such use but is adapted in the form illustrated for use wherever such a valve is needed or desired, and the inventive idea is further capable of modification and adaptation to many other tools, machines and uses.

Among the objects of the invention are to provide a valve of the type described characterized by simplicity, few parts, rugged construction, which does not become worn and leaky in service, which is automatically retained in adjusted position, and which is not unduly expensive to manufacture and assemble.

In order to illustrate the invention, a preferred embodiment thereof is shown in the accompanying drawings in which:

Fig. 1 shows the improved valve in perspective as mounted for use on a rock drill, the latter being shown largely in vertical longitudinal section;

Fig. 2 is a sectional view of the valve, substantially on the line 2—2 of Fig. 1;

Fig. 3 is a view similar to Fig. 2 showing the operating handle in a different position and looking in the opposite direction as on the line 3—3 of Fig. 4;

Fig. 4 is a sectional view on the line 4—4 of Fig. 3, indicating in full lines the closed position of the valve and in dot and dash line the open position of the valve;

Figs. 5 and 6 are detail views showing respectively the operating handle in plan and the valve cylinder proper in side elevation.

The embodiment of the invention shown for the purpose of illustration is one form of the fluid regulating valve particularly adapted for use as an exhaust choker valve on a pneumatic percussive tool such as the rock drill illustrated in Fig. 1. The valve comprises a hollow fitting 7 having a stem 8 provided with screw threads 9 or other suitable attaching means, and a portion 10 forming a valve casing through which extends a bore 11 in which is seated the cylindrical valve proper 12 arranged to be actuated by a handle 13; the handle additionally serves to retain the valve 12 within its bore and in adjusted position as will later appear. The bore 11 has any desired number of ports to be controlled by the valve 12. In the present instance there are two ports, the one 14 corresponding to the passage through stem 8 and the other port 15 extending through casing 10 and opening into the atmosphere. To interconnect these ports, the valve 12 is suitably recessed or cut away at 16, the uncut away portion serving to close port 14 in one position of the valve (see Fig. 4).

Handle 13 is preferably of stiff wire coiled at its central portion to provide the grip portion 17 and to place under tension the inwardly converging arms 18 thereof which terminate in inwardly offset substantially parallel ends 19. Ends 19 serve as the operative connection between the handle and cylindrical valve 12, being received in transverse grooves 20 in the opposite ends of the valve. It will thus be evident that the handle 13 straddles the casing portion of fitting 7 and holds the valve 12 within its bore. Grooves 20 are of sufficient depth to permit the offset ends 19 to project within the bore 11, so that the shoulders 21 formed by the offsetting of these ends engage within the bore to prevent the accidental removal of the handle (see Fig. 3). By this construction, the arms 18 of handles 13 adjacent the ends 19, frictionally engage casing 10 of the fitting, so that the resiliency of the handle serves to retain the valve in adjusted position. To limit the throw of the valve, stop shoulders 22 may be provided on the casing in any desired manner as by cutting away a portion of the latter, the handle arms 18 then frictionally engaging the faces of the cut away portions. With the described construction and with a stiff spring handle, the pressure of the arms 18 of the latter upon the sides of the casing 10 is amply sufficient to hold the valve 12 in adjusted position in spite of the vibration of the tool to which the valve may be secured. As an added measure of precaution, however, the casing 10 may be notched as indicated at 24 (Fig. 1) to form a positive stop for the handle in both open and closed position of the valve.

Fig. 1 illustrates a typical installation of the valve for use as a choker, wherein stem 8 of the fitting has been threaded into a boss $a$ upon the cylinder A of a rock drill of the percussive type, the bore of the boss $a$ connecting with the exhaust groove $a'$ in the piston chamber. The stem of the valve may have a lock nut 23 thereon to prevent the valve assembly from working loose in its connection with boss $a$. As shown, the handle 13 of the valve is in position to connect the ports 14 and 15 of the valve. This is the normal position with the drill exhausting directly to atmosphere. When it is desired to send a strong blast of air through the drill steel to blow out the cuttings, the handle 13 is swung up to its upper or valve closing position whereupon the fluid pressure in the back of the piston chamber, being unable to escape to atmosphere, holds piston B in its lower position and passing along the grooves of the rifle bar C gains access to the water tube opening $b$ and thence passes down into the bore of the drill steel.

From the above it will be apparent that the improved type of valve herein described by reason of its simplicity and rugged construction is particularly adapted for use wherever it is in an exposed position and subjected to rough treatment as upon rock drills, that the valve member itself being cylindrical or of the Corliss type has ample bearing surfaces insuring long wear without leakage, and that the spring handle straddling the valve casing and comprising in the one element the means for retaining the valve cylinder in place and for holding the same in adjustment by constant pressure of its arms against the casing contributes largely to the simplicity and reliability of the device.

Having now described my invention, what I claim and desire to secure by Letters Patent is:

1. A fluid regulating valve comprising a casing having a bore therethrough and ports opening into said bore, a valve within said bore arranged to control said ports, an operating handle loosely engaging the ends of said valve and making frictional contact with said casing to hold the valve in adjusted position, and means on said handle projecting within the bore of said casing for maintaining said handle against accidental removal.

2. A fluid regulating valve comprising a fitting having a bore and ports opening into said bore, a cylindrical valve of uniform diameter seated in said bore and controlling said ports, and means retaining said cylindrical valve in place comprising a resilient member having substantially parallel arms engaging the ends of said valve and having inwardly offset shoulders engaging within the bore of said fitting whereby the parts are maintained in operative relationship.

3. A fluid regulating valve comprising a fitting having a bore and ports opening into said bore, a cylindrical valve in said bore, and a spring retainer having offset substantially parallel ends straddling said fitting and projecting within said bore, said ends being loosely received in grooves in the ends of said valve whereby said retainer serves as a handle for actuating said valve, said offset ends forming stop shoulders to prevent accidental removal of said retainer.

4. A fluid regulating valve comprising a fitting having a bore and ports opening into said bore, a cylindrical valve in said bore, and a spring retainer having offset substantially parallel ends straddling said fitting and projecting within said bore, said ends being loosely received in grooves in the ends of said valve whereby said retainer serves as a handle for actuating said valve, the grooves in said valve being of a depth to permit the parts of the retainer adjacent said ends to frictionally engage said fitting whereby the resiliency of the retainer serves to hold the valve in adjusted position.

5. A fluid regulating valve comprising a fitting having a bore and ports opening into said bore, a cylindrical valve in said bore, and a retainer for said valve of wire coiled at its central portion to form a handle or grip part, and having resilient inwardly offset parallel ends straddling the fitting and projecting within said bore, said valve having transverse recesses in its ends in which the ends of said retainer are loosely received, the parts of said retainer adjacent said ends bearing against said fitting yieldingly to hold the valve in adjusted position.

6. A fluid regulating valve consisting of but three parts, a fitting having a bore therethrough and ports opening into said bore, a valve in said bore for controlling said ports, and a combined actuating handle and retainer operatively engaging said valve and having parts frictionally engaging opposite sides of said fitting adjacent said valve yielding to hold the valve in adjusted position and having other parts projecting within the opposite ends of said bore to hold the handle against accidental separation for said fitting and said valve.

Signed by me at Detroit this 24th day of January 1924.

ERNEST PENBERTHY.